(12) United States Patent
Clampitt et al.

(10) Patent No.: US 10,126,517 B2
(45) Date of Patent: Nov. 13, 2018

(54) FIBER OPTIC CABLE STRUCTURED TO FACILITATE ACCESSING AN END THEREOF

(71) Applicant: Corning Optical Communications LLC, Hickory, NC (US)

(72) Inventors: Jeffery Alan Clampitt, Granite Falls, NC (US); Julian Latelle Greenwood, III, Hickory, NC (US); Leigh Rooker Josey, Hickory, NC (US); Warren Welborn McAlpine, Hickory, NC (US); Eric John Mozdy, Horseheads, NY (US); Jorge Roberto Serrano, Newton, NC (US)

(73) Assignee: Corning Optical Communications LLC, Hickory, NC (US)

( * ) Notice: Subject to any disclaimer, the term of this patent is extended or adjusted under 35 U.S.C. 154(b) by 155 days.

(21) Appl. No.: 14/459,653

(22) Filed: Aug. 14, 2014

(65) Prior Publication Data
US 2015/0355430 A1 Dec. 10, 2015

Related U.S. Application Data

(60) Provisional application No. 62/010,071, filed on Jun. 10, 2014.

(51) Int. Cl.
*G02B 6/44* (2006.01)

(52) U.S. Cl.
CPC ......... *G02B 6/4495* (2013.01); *G02B 6/4432* (2013.01); *G02B 6/4434* (2013.01); *G02B 6/4435* (2013.01); *G02B 6/4413* (2013.01)

(58) Field of Classification Search
None
See application file for complete search history.

(56) References Cited

U.S. PATENT DOCUMENTS

| 4,765,712 | A | * | 8/1988 | Bohannon, Jr. | G02B 6/443 385/111 |
|---|---|---|---|---|---|
| 4,896,940 | A | * | 1/1990 | Kathiresan | G02B 6/4403 385/112 |
| 5,155,789 | A | * | 10/1992 | Le Noane | G02B 6/441 385/102 |
| 5,173,961 | A | * | 12/1992 | Chiasson | G02B 6/443 385/112 |
| 5,777,271 | A |  | 7/1998 | Carlson et al. | |

(Continued)

OTHER PUBLICATIONS

Patent Cooperation Treaty, International Search Report and Written Opinion for PCT/US15/34453, dated Sep. 15, 2015, 12 pages.

(Continued)

*Primary Examiner* — Chad H Smith
(74) *Attorney, Agent, or Firm* — William D. Doyle

(57) ABSTRACT

A fiber optic cable includes a core, armor surrounding the core, and a jacket surrounding the armor. The core includes tubes, each tube having a passage defined therein, optical fibers positioned in the passages, and a binder sleeve defining an exterior of the core. Portions of the binder sleeve are directly bonded to the armor, while other portions are not. Spacing between the armor and the core, as well as the bond between the armor and binder sleeve, facilitate tubing-off of an end section of the cable to include removal of the binder sleeve.

14 Claims, 4 Drawing Sheets

(56) References Cited

U.S. PATENT DOCUMENTS

| | | | | |
|---|---|---|---|---|
| 5,905,834 | A * | 5/1999 | Anderson | G02B 6/441 |
| | | | | 385/111 |
| 6,912,347 | B2 * | 6/2005 | Rossi | G02B 6/4438 |
| | | | | 385/112 |
| 7,099,542 | B2 | 8/2006 | Ledbetter et al. | |
| 7,359,600 | B2 * | 4/2008 | Kim | G02B 6/4429 |
| | | | | 385/100 |
| 8,577,196 | B1 | 11/2013 | McNutt | |
| 8,620,124 | B1 | 12/2013 | Blazer et al. | |
| 8,913,862 | B1 | 12/2014 | Emmerich et al. | |
| 9,309,997 | B2 * | 4/2016 | Jeon | F16L 9/19 |
| 2002/0141712 | A1 | 10/2002 | O'Connor et al. | |
| 2003/0118295 | A1 * | 6/2003 | Lail | G02B 6/4411 |
| | | | | 385/101 |
| 2004/0234215 | A1 | 11/2004 | Serrano et al. | |
| 2012/0134634 | A1 * | 5/2012 | Keller | G02B 6/4429 |
| | | | | 385/113 |
| 2014/0086543 | A1 | 3/2014 | Blazer et al. | |
| 2015/0110451 | A1 | 4/2015 | Blazer et al. | |

OTHER PUBLICATIONS

EP15807392.4 Search Report dated Jan. 5, 2018, European Patent Office.
Thefoainc: "Fiber optic cable: Part 6—Armored cable" 2010, 1 pg. retrieved from https://www.youtube.com/watch?v=DdmxQSkssNI&t=7s.

* cited by examiner

FIBER OPTIC CABLE STRUCTURED TO FACILITATE ACCESSING AN END THEREOF

RELATED APPLICATIONS

This Application claims the benefit of U.S. Application No. 62/010,071 filed Jun. 10, 2014, which is incorporated herein by reference in its entirety.

BACKGROUND

Aspects of the present disclosure relate generally to fiber optic cables, such as armored fiber optic cables that support one or more optical fibers and include an armor layer.

Contents of armored fiber optic cables, such as optical fibers therein, may need to be accessed from time to time. A typical access location on the cable is an end of the cable. The armor may be tough to remove or circumvent. As such, many operators use a "ring cut" process to sever an end section of the armor and jacket of the cable, which can then be pulled off of the interior contents of the cable in the end section. This access process is called "tubing off" because the portions of the armor and jacket that are pulled off form a tube.

For conventional fiber optic cables, the tubing off process may be cumbersome. For example, if the respective cable includes binder yarns, water-swellable tape, or other layers or contents, these additional elements may need to be cut, pulled away, peeled off or otherwise removed to access optical fibers of the cable.

Binder films may be used and may replace at least some common components in loose tube fiber optic cables, such as binder yarns and water-swellable tapes. For example, a binder film may serve as a binder and a carrier of water-swellable powder. The binder films may be positioned between the armor and contents of the cable core, such as buffer tubes carrying optical fibers. However, Applicants have found that binder films, in some configurations, may hinder the tubing off process because the binder films may increase the force required to pull off the jacket and armor of the severed end section of the respective cable.

A need exists for a fiber optic cable with structure that allows for fast and/or easy access of an end section of the cable.

SUMMARY

Some embodiments relate to a fiber optic cable, which includes a core, armor surrounding the core, and a jacket surrounding the armor. The core includes tubes, each tube having a passage defined therein, optical fibers positioned in the passages, and a binder sleeve defining an exterior of the core. Portions of the binder sleeve are directly bonded to the armor, while other portions are not. Spacing between the armor and the core, as well as the bond between the armor and binder sleeve, facilitate tubing-off of an end section of the cable to include removal of the binder sleeve.

Other embodiments relate to a fiber optic cable, which includes a core, armor surrounding the core, and a jacket surrounding the armor. The core includes tubes, each tube having a passage defined therein, optical fibers positioned in the passages, and a binder sleeve defining an exterior of the core. Further, the core has raised portions on the exterior thereof as well as recessed portions, where the raised portions extend radially outward from a center of the core further than the recessed portions. The binder sleeve is directly bonded to the armor at at least some of the raised portions and is not directly bonded to the armor at at least some of the recessed portions. Such a structure may facilitate quick and easy tubing-off of an end section of the cable, including removal of the binder sleeve.

Still other embodiments relate to a fiber optic cable, which includes a core, armor surrounding the core, and a jacket surrounding the armor. The core includes tubes, each tube having a passage defined therein, optical fibers positioned in the passages, and a binder sleeve defining an exterior of the core. The armor is corrugated, where the corrugations have peaks and valleys along a surface of the armor facing the core, the peaks extending radially inward toward a center of the cable further than the valleys. At least some of the peaks of the corrugations are directly bonded to the binder sleeve of the core and at least some of the valleys are not directly bonded to the binder sleeve. Such a structure may facilitate quick and easy tubing-off of an end section of the cable, including removal of the binder sleeve.

Other embodiments relate to a fiber optic cable, which includes a core, armor surrounding the core, and a jacket surrounding the armor. The core includes tubes, each tube having a passage defined therein, optical fibers positioned in the passages, and a binder sleeve defining an exterior of the core. The binder sleeve is at least partially bonded to the armor. Spacing between the armor and the core is such that for an end section of the cable—where the armor and the jacket of the end section are fully severed from the armor and the jacket of the rest of the cable 50 centimeters from an end of the cable corresponding to the end section, and where the tubes and the optical fibers of the core of the end section are not severed from corresponding tubes and optical fibers of the core of the rest of the cable—the binder sleeve remains bonded to the armor and the jacket of the end section when the armor and the jacket of the end section are pulled in a lengthwise direction of the cable away from the rest of the cable such that the jacket and the armor of the end section, as well as at least some of the binder sleeve bonded to the armor, slide together and relative to the tubes and the optical fibers of the core of the end section.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serves to explain principles and operations of the various embodiments. As such, the disclosure will become more fully understood from the following Detailed Description, taken in conjunction with the accompanying Figures, in which.

DETAILED DESCRIPTION

Figure 1:
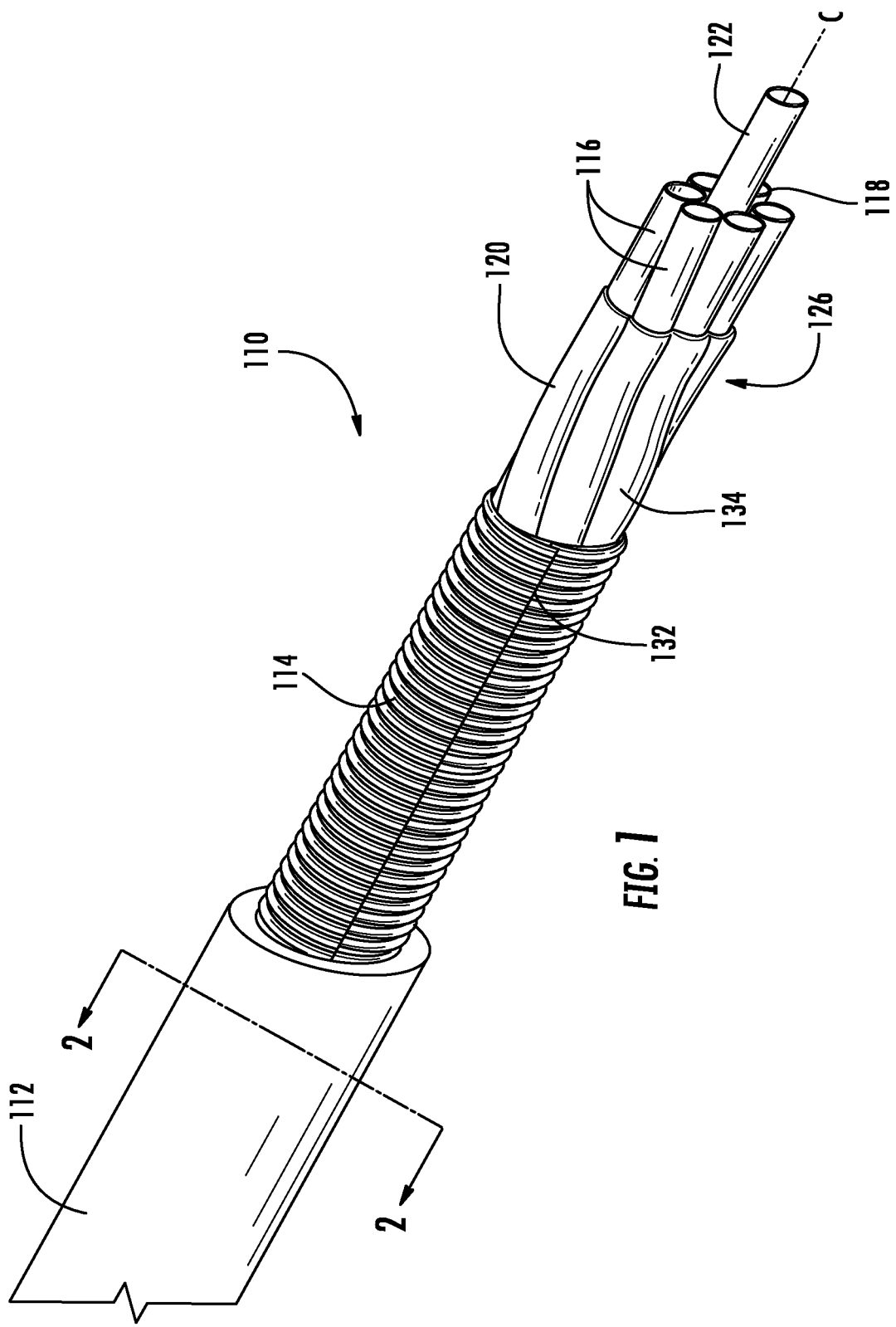
FIG. 1 is a perspective view of a fiber optic cable according to an exemplary embodiment.
Figure 2:
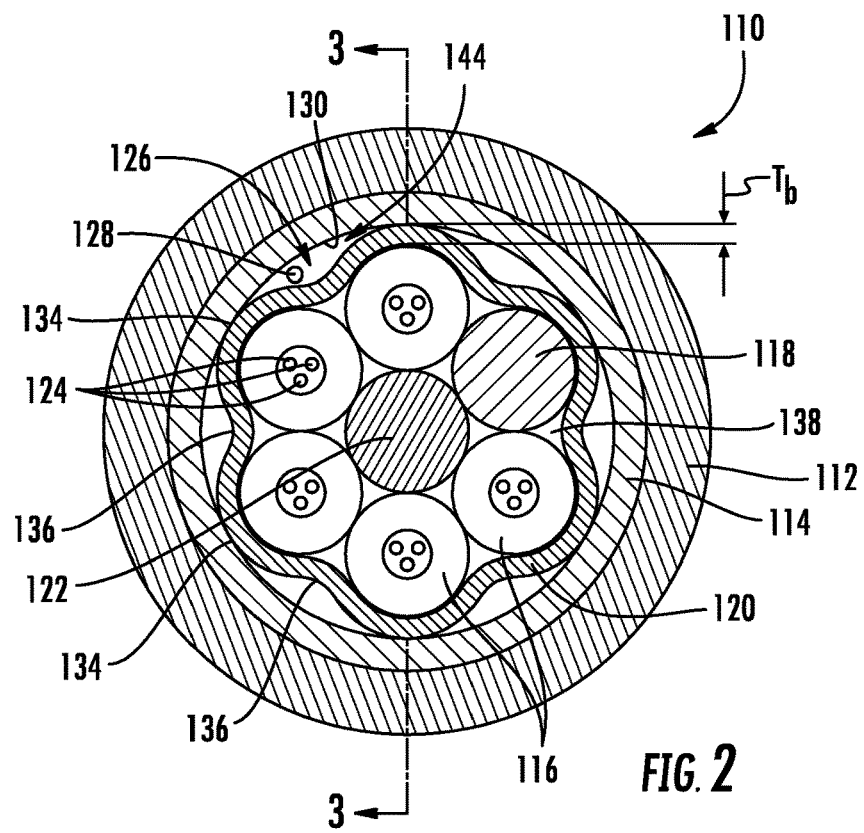
FIG. 2 is a cross-sectional view of the fiber optic cable of FIG. 1 taken along line 2-2 of FIG. 1.

Referring to FIGS. 1-2, a fiber optic cable, in the form of a six-position loose tube fiber optic cable 110, includes a jacket 112 and contents interior thereto, which may include armor 114 (e.g., armor layer, metal layer, wrapped corrugated steel, copper, aluminum), buffer tubes 116, filler or dummy rods 118, a binder (e.g., a binder sleeve 120, binder yarns, adhesive binder), thin-walled micromodules, sub-unit cables with interior contents themselves, strength members (e.g., strength rod(s), such as a central strength member 122, which may include steel rod(s), glass reinforced plastic rod(s); tensile yarn, such as aramid or fiberglass yarn), tapes (e.g., water-swellable tape, fire-retardant tape), optical fiber(s) 124 (FIG. 2), and other contents. For an armored cable, such as the cable 110 as shown in FIGS. 1-2, a core 126 of the cable 110 includes contents of the cable 110 that are interior to the jacket 112 and the armor 114. In some embodiments, the cable 110 further includes ripcords in the core 126 to facilitate removal of the jacket 112 and the armor 114, such as ripcords 128 (FIG. 2) placed between the armor 114 and the core 126. In some embodiments, the jacket 112 and/or the armor 114 include features that may facilitate access in addition to or as an alternative to ripcords 128, such as co-extruded tear lines in the jacket 112 and score line in the armor 114.

Figure 3:
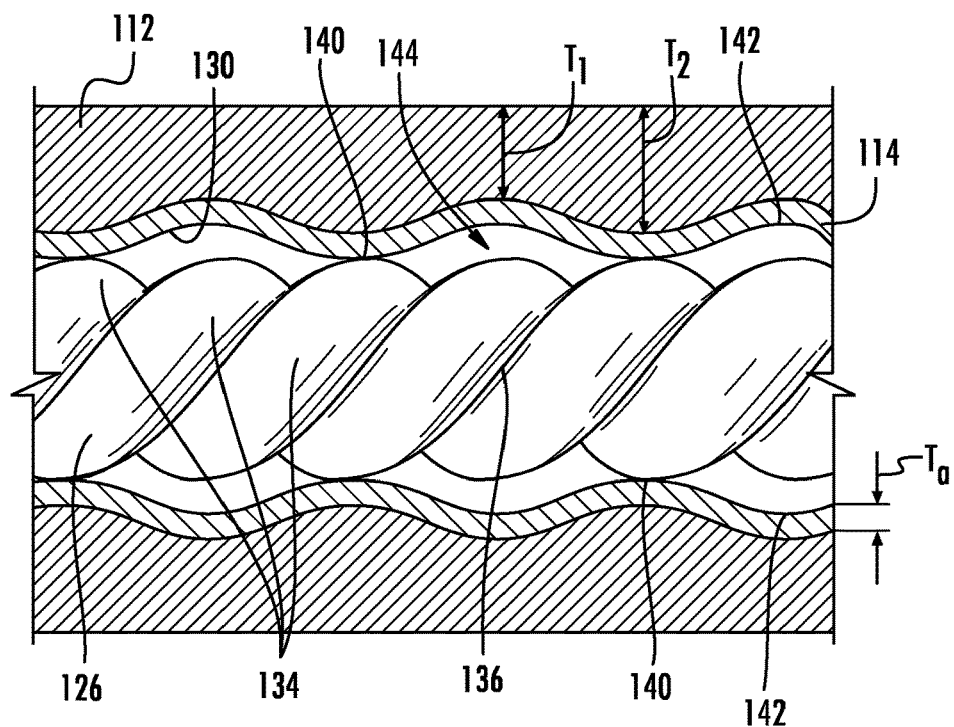
FIG. 3 is a cross-sectional view of the jacket and armor of the fiber optic cable of FIG. 1 taken along line 3-3 of FIG. 2, showing the core of the fiber optic cable.

The jacket 112 may be extruded over the interior contents of the cable 110, and may be include, such as primarily include (e.g., greater than 50% by volume), a polymer, such as a thermoplastic, such as polyethylene, polyvinyl chloride, a low-smoke-zero-halogen material, or other polymers. In some embodiments, the jacket 112 defines the exterior of the fiber optic cable 110. As shown in FIGS. 1-2, the jacket 112 has an average wall thickness of at least 0.75 mm, such as at least 1 mm; and/or the jacket 112 has an average wall thickness of no greater than 10 mm, such as no greater than 5 mm, where the average may be calculated, for example, over a 10 m section of the cable. The specific wall thickness (e.g., $T_1$, $T_2$ as shown in FIG. 3) may vary from point to point due to corrugation of the armor 114, for example. In other embodiments, the jacket 112 may have a different average wall thickness.

The jacket 112 may be round in cross-section, such as generally circular in outermost periphery, and may form a generally cylindrical or annular tube that defines a cavity 130 that is at least partially filled with the interior contents of the fiber optic cable 110. In FIGS. 1-2, the fiber optic cable 110 is round in cross-section and has an average outer diameter of greater than 5 mm, such as at least 6.5 mm, and/or no greater than 5 cm, such as 3 cm or less. In other embodiments, the fiber optic cable may have a different outer diameter. In other embodiments, the cross-sectional periphery of the jacket 112 may be non-circular, such as oblong, elliptical, or otherwise shaped.

According to an exemplary embodiment, interior contents of the fiber optic cable 110 include one or more optical fibers 124, such as loose, individual optical fibers, as shown in FIG. 2, for example; or optical fibers arranged side-by-side with one another and bound together in a common matrix (e.g., acrylate) in sets of two, four, eight, twelve, twenty-four, etc. optical fibers to form fiber optic ribbons, which may be stacked on top on one another in tubes of such a cable. The optical fibers 124 may be single-mode, multi-mode, multi-core, bend-insensitive, or otherwise structured. In some embodiments, the optical fibers 124 include a glass core surrounded by a glass cladding, with the cladding surrounded by one or more protective polymeric coatings, such as a softer, interior stress-isolation layer, and a harder, scratch-resistant shell exterior thereto.

Referring still to FIGS. 1-2, the fiber optic cable 110 includes the armor 114, which is shown as a corrugated metallic sheet that is wrapped or rolled around a core 126 of the cable 110. For example, the armor 126 may have an overlap 132 thereof, as shown in FIG. 1. In other embodiments, a narrower metal tape may be helically wrapped around the core 126, which may provide greater flexibility to the cable 110. According to an exemplary embodiment, the armor 114 includes, such as primarily includes steel, iron, copper, aluminum or another metal. In other contemplated embodiments, the armor 114 may be or primarily include a tough polymer or ceramic, such as a dielectric armor. In some embodiments, the armor 114 is at least about 0.2 mm in thickness $T_a$, such as at least 1 mm, and/or no greater than 1 cm, such as 10 mm or less in thickness $T_a$, where the thickness $T_a$ may vary depending upon material of the armor 114.

In some embodiments, the jacket 112 is extruded over the armor 114 such that the jacket 112 and the armor 114 are coupled to one another. In some embodiments, the jacket 112 and the armor 114 may be tightly bonded to one another, such as in embodiments where the material of the jacket 112 bonds well to the material of the armor 114. In other such embodiments, the armor 114 may include a coating (e.g., laminate, exterior layer(s)) of a bonding agent, such as maleic anhydride, ethylene acrylic acid, or a copolymer thereof, that may facilitate bonding of the armor 114 and the jacket 112, such as in some embodiments where the jacket 112 includes polyethylene. In still other such embodiments, the bonding agent may be compounded into the material of the jacket 112. Bonding of the jacket 112 to the armor 114 may be greater than the internal tear strength of the material of the jacket 112 such that peeling of the jacket 112 from the armor 114 results in torn pieces of the jacket 112 remaining attached to the armor 114. In other embodiments, bonding between the jacket 112 and the armor 114 is controlled (e.g., reduced relative to the above-described bonds), such as by inclusion of a lesser-strength glue or other intermediate material (e.g., talc, water-swellable powder, etc.) that at least partially decouples the jacket 112 and the armor 114, which may allow an operator to peel the jacket 112 from the armor 114 for accessing contents of the cable 110 at a mid-span location or for other reasons.

According to an exemplary embodiment, the core 126 of the fiber optic cable 110 includes buffer tubes 116 and/or dummy rods 118 that may be stranded (e.g., wound in a pattern) around a central strength member 122. The central strength member 122 may be or include a glass-reinforced plastic rod, a steel rod, or another material. The central strength member 122 may additionally include "up-jacketed" material (i.e., a thermoplastic coating) to increase the diameter of the central strength member 122 to facilitate a particular pattern of stranding and/or number of buffer tubes 116, for example. The up-jacket material may include polyethylene, polyvinyl chloride, or another material that is extruded over a glass-reinforced plastic rod, steel rod, etc. of the central strength member 122.

In some embodiments, the pattern of stranding of the buffer tubes 116 and/or dummy rod 118 may include a so-called "SZ" strand pattern, where the stranded elements are wound with a right-hand lay, which is then reversed at a reversal point, such as after one to ten wraps, then wound with a left-hand lay for another such number of wraps, and then reversed again, back forth between right- and left-hand lay windings. In other embodiments, the strand pattern may be helical or another pattern. In still other embodiments, the buffer tubes 116, dummy rod(s) 118, micromodules, sub-unit cables, or other elements may not be stranded and/or the cable may not include a central strength member. In other embodiments, the fiber optic cable may include different numbers of buffer tubes 116 and/or dummy rods 118, including no dummy rods; or the buffer tubes 116 shown in the FIGURES may be replaced by or alternatively represent thin-walled micromodule-type buffer tubes or tubes that house complete sub-unit cables.

As shown in FIG. 1, the buffer tubes 116 and dummy rod 118 are stranded about the central strength member in the SZ pattern. To hold the buffer tubes 116 and dummy rod 118 in that pattern, such as between intermediate stages during the manufacture of the fiber optic cable 110, the cable 110 includes the binder sleeve 120. As shown in FIGS. 1-3, the binder sleeve 120 is a continuous (radially and lengthwise) thin-layer of polymer, such as a polyethylene or polypropylene film having a thickness $T_b$ less than 1 mm, such as 0.5 mm or less, that is extruded over the stranded buffer tubes 116 and dummy rods 118 immediately after the stranding thereof during manufacturing, such as before the buffer tubes 116 and dummy rods 118 may significantly unwind or shift relative to the central strength member 122. Following extrusion, the binder sleeve 120 quickly contracts and constrains the buffer tubes 116 and dummy rod 118. A caterpuller or other piece of manufacturing equipment (e.g., capstan) may be used to hold the stranded buffer tubes 116 and dummy rod 118 while the binder sleeve 120 cools and contracts. Water-swellable powder or other powder may be blown into the binder sleeve 120 during extrusion thereof, which may partially embed the powder particles into the binder sleeve 120 and provide a water-blocking function to the binder sleeve 120. In some such embodiments, lubricating elements may also be blown or injected into the binder sleeve 120, such as during extrusion thereof, and the lubricating elements may include oil and talc, or other lubricating elements.

During manufacturing of the fiber optic cable 110, the buffer tubes 116 may be extruded around the optical fibers 124. The buffer tubes 124 may then be stranded about the central strength member 122, with the binder sleeve 120 then extruded thereover to hold the stranding pattern, forming the core 126 of the fiber optic cable 110. The armor 114 may then be corrugated or otherwise manipulated and wrapped around the core 126. The jacket 112 may then be extruded over the armor 114, to seal and environmentally protect the armor 114 and core 126.

Referring now to FIGS. 2-3, according to an exemplary embodiment, the armor 114 is applied over the core 126 to provide particular spacing therebetween, which facilitates the "tubing-off process" described above in the Background for accessing an end of the cable 110. In some embodiments, the core 126 has raised portions 134 on the exterior thereof as well as recessed portions 136, where the raised portions 134 extend radially outward from a center C of the core 126 or of the cable 110 further than the recessed portions 136. For example, the binder sleeve 120 may take the shape of underlying interior contents of the fiber optic cable 110, including underlying buffer tubes 116 and interstices 138 therebetween. In some embodiments, as shown in FIG. 3, the armor 114 is corrugated and the corrugations have peaks 140 and valleys 142 along a surface of the armor 114 facing the core 126, the peaks 140 extending radially inward toward the center C further than the valleys 142, as shown in FIGS. 1 and 3. Spacing between the armor 114 and the core 126 is such that portions of the binder sleeve 120 are in close or direct contact with the armor 114.

According to an exemplary embodiment, as the jacket 112 is extruded over the armor 114, heat from the extruded material of the jacket 112 is synergistically used to heat the armor 114 and at least partially melt the binder sleeve 120, which then bonds to the armor 114 to create direct coupling(s) therebetween. In some embodiments, the binder sleeve 120 is directly bonded to the armor 114 at at least some of the raised portions 134. In some such embodiments, the binder sleeve 120 is not directly bonded to the armor at at least some of the recessed portions 136. In some embodiments, at least some of the peaks 140 of the corrugations are directly bonded to the binder sleeve 120 of the core 126. In some such embodiments, at least some of the valleys 142 are not directly bonded to the binder sleeve 120. The same or similar bonding techniques described above for bonding of the armor 114 and the jacket 112 may be used to facilitate bonding of the armor 114 and the binder sleeve 120, including use of a bonding agent that is coated on the corresponding surfaces (e.g., interior surfaces, surfaces facing the binder sleeve 120) of the armor 114, a bonding agent compounded into the material of the binder sleeve 120, etc. In some embodiments, a bonding agent may be coated on a side (e.g., an outside) of the binder sleeve 120; and/or a bonding agent may be compounded into a coating or laminate of the armor 114.

While the armor 114 and the binder sleeve 120 may directly contact one another in parts of the cable 110, portions of the binder sleeve 120 are spaced apart from the armor 114. The directly bonded portions link the binder sleeve 120 and armor 114, so that when the armor 114 and jacket 112 are removed from underlying contents of the core 126 during "tubing off," the binder sleeve 120 is pulled off of the contents too. The portions of the binder sleeve 120 that are not directly bonded (i.e., instead bonded indirectly by connection to the directly bonded portions) generally include at least some free space 144 between the core 126 and the armor 114. That free space 144 provides room for the armor 114 to slide over the underlying interior contents of the fiber optic cable 110 and space for the contents to fill as the armor moves past, instead of further compressing the contents and increasing friction between the armor 114 and contents of the core 126. However, Applicants have discovered that the free space 144 (and corresponding spacing between the armor 114 and the core 126) should not be too great, or the binder sleeve 120 may tend to clump or bunch up and actually hinder the tubing-off process. For example, if the inner diameter of the armor 114 is still further increased relative to the core 114, then material to form the wider corresponding jacket 112 may be wasted and/or the cable 110 size may be inconvenient for operations in narrow ducts, etc. In other contemplated embodiments, the inner diameter of the armor may still further be increased compared to values disclosed herein.

According to an exemplary embodiment, spacing between the armor 114 and the binder sleeve 120 of the core is at least 0.5 mm on average, such as 0.7 mm on average, where the average compares the average core 126 cross-sectional dimension to the average armor 114 inner diameter, such as for a 5 meter length of the cable 110, which may be measured via profilometry or other analysis techniques. In other contemplated embodiments, the spacing between the armor 114 and the binder sleeve 120 of the core 126 may be less 0.5 mm on average. In some embodiments, portions of the binder sleeve 120 are spaced apart from the armor 114 such that the spacing between the armor 114 and the binder sleeve 120 is no greater than 1.5 mm on average, such as no greater than 1.3 mm on average. In other contemplated embodiments, the spacing between the armor 114 and the binder sleeve 120 may be greater than 1.5 mm on average.

Equipment for applying the armor 114 may include two or more dies in series, including a final closing die, which may be smaller than preceding dies and may roughly match the outer diameter of the armor 114 of the cable 110. There may be some springing back of the armor (non-plastic deformation) so that the final core OD may in fact be slightly larger than the final closing die size. According to an exemplary embodiment, the corrugation depth of the armor 114 is greater than 0.3 mm and/or less than 1.2 mm, such as about 0.7 mm, which may be measured with a thickness gauge and adjusted by spacing between corrugator rollers of the equipment, where the gauge measures outside surface of the valleys 142 and the inside surface of the peaks 140 of the corrugation, and therefore includes the armor thickness $T_a$. The core outer diameter, in Table 1 below, is about the maximum cross-sectional diameter of the core 126 including the binder sleeve 120, which assumes the spring-back effect of the armor exiting the closing die as negligible (e.g., less than 10% of the amount).

TABLE 1

| Final Finish Die Diameter (mm) | Corrugations Depth (mm) | Armor Inner Diameter (mm) | Core Outer Diameter (mm) | Spacing Between Armor & Core (mm) |
| --- | --- | --- | --- | --- |
| 9.4 | 1.4 | 8.0 | 7.2 | 0.8 |
| 9.6 | 1.4 | 8.2 | 7.2 | 1.0 |
| 9.8 | 1.4 | 8.4 | 7.2 | 1.2 |

In terms of spacing between the armor 114 (inner diameter) and core 126 (outer diameter), experimental testing by Applicants, summarized in Table 1 above, has found about 1 mm (e.g., 1±0.5 mm) of spacing to provide relatively good tube-off performance. Spacing of 1.0 mm resulted in lower tubing off force (i.e., to pull the severed armor and jacket off of the underlying core, discussed further below) than either 0.8 or 1.2 mm spacing. Applicants believe the tubing-off force increased for spacing of 0.8 mm due to increased friction between the binder sleeve 120 and contents of the core 126, such as the buffer tubes 116. Applicants believe the tubing-off force increased for spacing of 1.2 mm due to the binder sleeve bunching, which may have caused blockages or localized regions of increased friction between the armor 114 and contents of the core 126.

Figure 4:
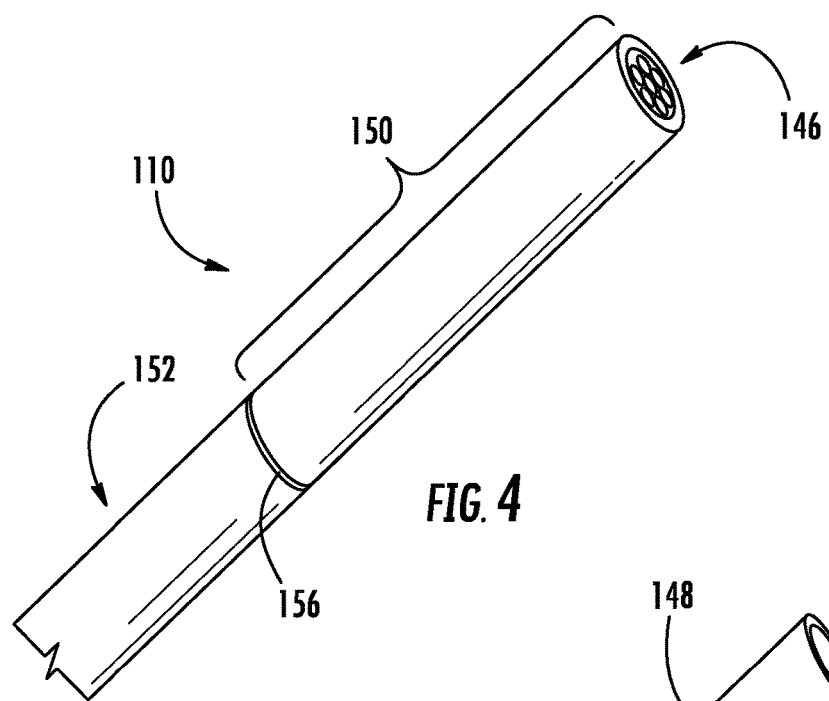
FIG. 4 is a perspective view of a fiber optic cable with a ring cut according to an exemplary embodiment.
Figure 5:
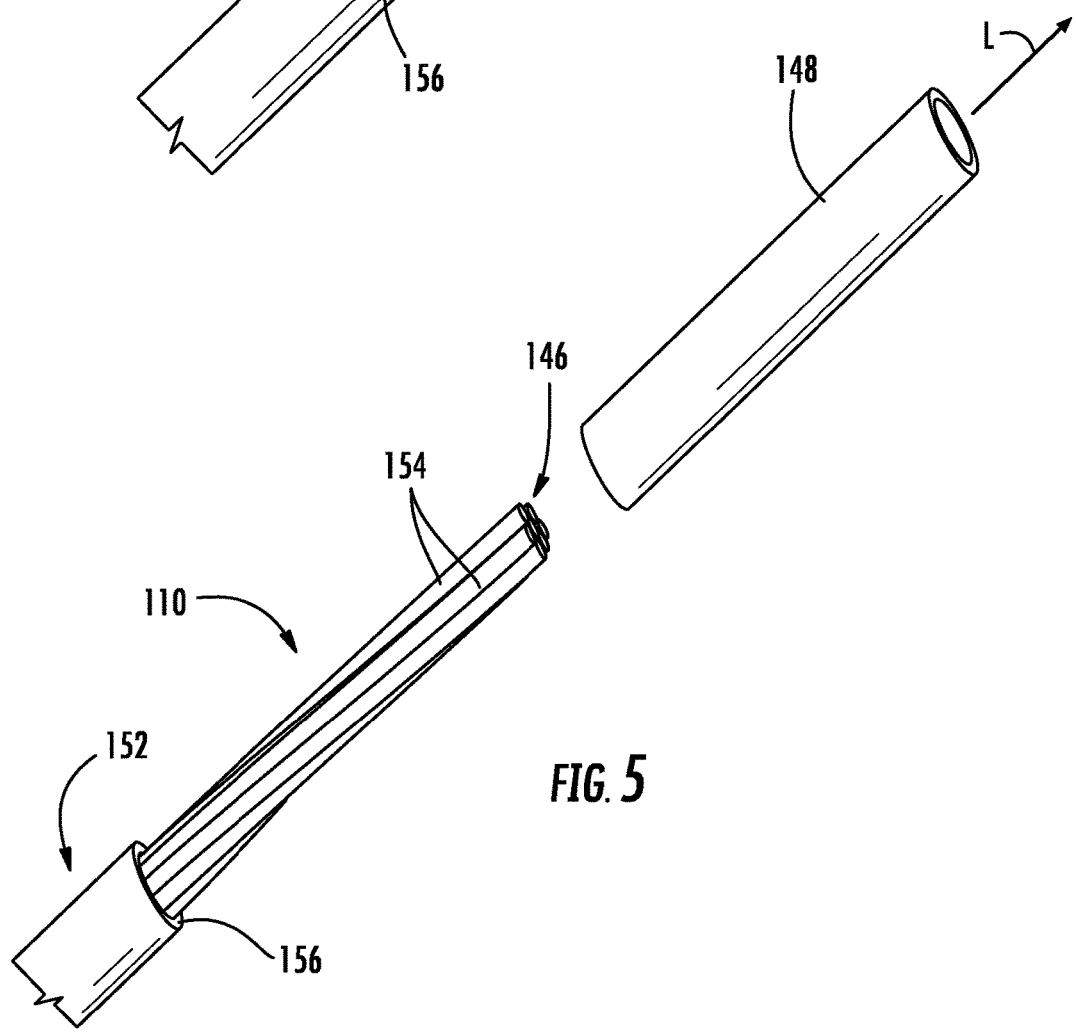
FIG. 5 is a perspective view of the fiber optic cable of FIG. 4 with a tube formed from the jacket and armor of the cable pulled off of the core of the end section according to an exemplary embodiment.

Referring now to FIGS. 4-5, technology disclosed herein structurally facilitates the "tubing off" process to access an end 146 of a fiber optic cable 110, where contents of the core 126 that are interior to the binder sleeve 120 are directly exposed immediately after the tube 148 (i.e., jacket 112, armor 114, and binder sleeve 120 of the end section 150) is pulled off of the interior contents of the core 126 (e.g., buffer tubes 116, dummy rod 118, central strength member 122). For tubing off, the armor 114 and the jacket 112 of the end section 150 are fully severed (e.g., ring cut 156) from the armor 114 and the jacket 112 of the rest 152 of the cable 110, such as at about 50 centimeters from the end 146 of the cable 110. But the tubes 154 (e.g., buffer tubes 116, micromodules, sub-unit cables) and the optical fibers 124 of the core 126 of the end section 150 are not severed from corresponding tubes and optical fibers 124 of the core 126 of the rest 152 of the cable 110. Spacing between the armor 114 and the core 126 is such that the binder sleeve 120 remains bonded to the armor 114 and the jacket 112 of the end section 150 when the armor 114 and the jacket 112 of the end section 150 are pulled in a lengthwise direction L of the cable 110 away from the rest 152 of the cable 110 such that the jacket 112 and the armor 114 of the end section 150 slide together, relative to, and off of the tubes 154 and the corresponding optical fibers 124 of the core 126 of the end section 150.

At least in part due to the above-described structure of the fiber optic cable 110, a tube-off force is not excessive to pull the jacket 112 and the armor 114 of the end section 150 in the lengthwise direction L of the cable 110 away from the rest 152 of the cable 110 such that the jacket 112 and the armor 114 of the end section 150 slide relative to the tubes 154 and the optical fibers 124 therein of the core 126 of the end section 150. Excessive tube-off force may make the access process cumbersome and/or may damage buffer tubes. For example, in some embodiments, the tube-off force is not more than 150 newtons. This tube-off force will naturally vary throughout the movement of the tube 148 relative to the tubes 154, such as being greatest in magnitude initially and then decreasing as the jacket 112 and the armor 114 of the end section 150 move over and off of the core 126 of the end section 150. In some embodiments, the tube-off force exceeds 20 newtons and/or the tube-off force is not more than 90 newtons.

Applicants believe that shrinkage of the material of the jacket 112, following extrusion, may tighten the armor 114 around the core 126 and increase friction between the armor 114 and the core 126, possibly too much and thereby excessively increasing the tube-off force if not countered or designed around. Minimizing shrinkage of the jacket 112 may be accomplished through structural properties of the armor 114 such as thickness and corrugation depth (providing structural rigidity). Another approach is selecting and/or formulating the material of the jacket 112 to have a lesser coefficient of thermal expansion, such as through base resin selection as well as the addition of inorganic adjuncts and/or fillers that have relatively low coefficients of thermal expansion.

In contemplated embodiments, the fiber optic cable 110 may include a low-friction core 126. In such embodiments, lubricant may be added to the core 126, inside the binder sleeve 120, to decrease the friction between the binder sleeve 120 and contents of the core interior to the binder sleeve 120; thereby allowing the binder sleeve 120 to more easily slide off of the contents during the tubing off process. For example, grease, Teflon, oil, or solid lubricant may be added to the core 126, such as by injecting the lubricant under the binder sleeve 120 at the point of extrusion of the binder sleeve 120, or coating the buffer tubes 116 prior to feeding them into the extruder of the binder sleeve 120. In other embodiments, the solid lubricant may be or be mixed with other solid materials, such as water swellable powder. The solid lubricant may include talc powder and/or superabsorbent powder particles. Materials of the binder sleeve 120 may be selected to be incompatible and not bond to materials of the underlying core contents, such as the buffer tubes 116. In one embodiment, the binder sleeve 120 is formed primarily from polyethylene and the buffer tubes 116 are formed primarily from or include an outermost layer thereof formed primarily from polypropylene, acrylonitrile butadiene styrene, polycarbonate, or another material, which may be generally incompatible with polyethylene in terms forming strong chemical bonds.

In contemplated embodiments, the binder sleeve 120 is pulled off of the core 126 with the jacket 112 and the armor 114 of the end section 150 during the tubing off process, without the binder sleeve 120 being directly bonded to the armor 114. Instead, friction between the armor 114 and the binder sleeve 120 may be greater than friction between the binder sleeve 120 and contents of the core 126 interior thereto. As such, the imbalance in frictional forces causes the binder sleeve 120 to be pulled off of the core 126 with the jacket 112 and the armor 114. Lubricants interior to the binder sleeve 120 may facilitate this process. Likewise adhesives and/or a high-friction surface on the interior of the armor 114 and/or on the exterior of the binder sleeve 120, or other features, may facilitate this process by increasing friction and/or adhesion between the armor 114 and the binder sleeve 120, relative to the binder sleeve 120 and contents of the core 126 interior thereto.

In contemplated embodiments, a heater (inductive or otherwise) may be applied to the armor at the final armor closing die during manufacturing of the cable 110, so that the heater heats up the armor 114 when the armor 114 is tightly bound to the core 126 and the heated armor 114 at least partially melts the binder sleeve 120 and bonds to the binder sleeve 120. Such bonding may occur over more surface area than does occur by simply using the extruded jacket 112 to heat the binder sleeve 120, possibly because the armor 114 may have sprung back slightly and moved away from the core 126. In other embodiments, such a heater may be applied elsewhere on the manufacturing line as well or the melt temperature of the extrudate could be adjusted within the allowable range for the given sheath polymer to target specific bonding levels by using heat at the extruder.

In contemplated embodiments, the core 126 may be pressurized to raise or blow outward the binder sleeve 120, to increase contact with the armor 114, such as at the point on the manufacturing line of extruding the jacket 112 and/or heating the armor 114, as just described. Alternately, a vacuum may be applied to the exterior of the core 126 to draw the binder sleeve 120 outward and to the armor 114 to increase bonding. In still other embodiments, air interior to the core may be heated to expand the core.

Figure 6:
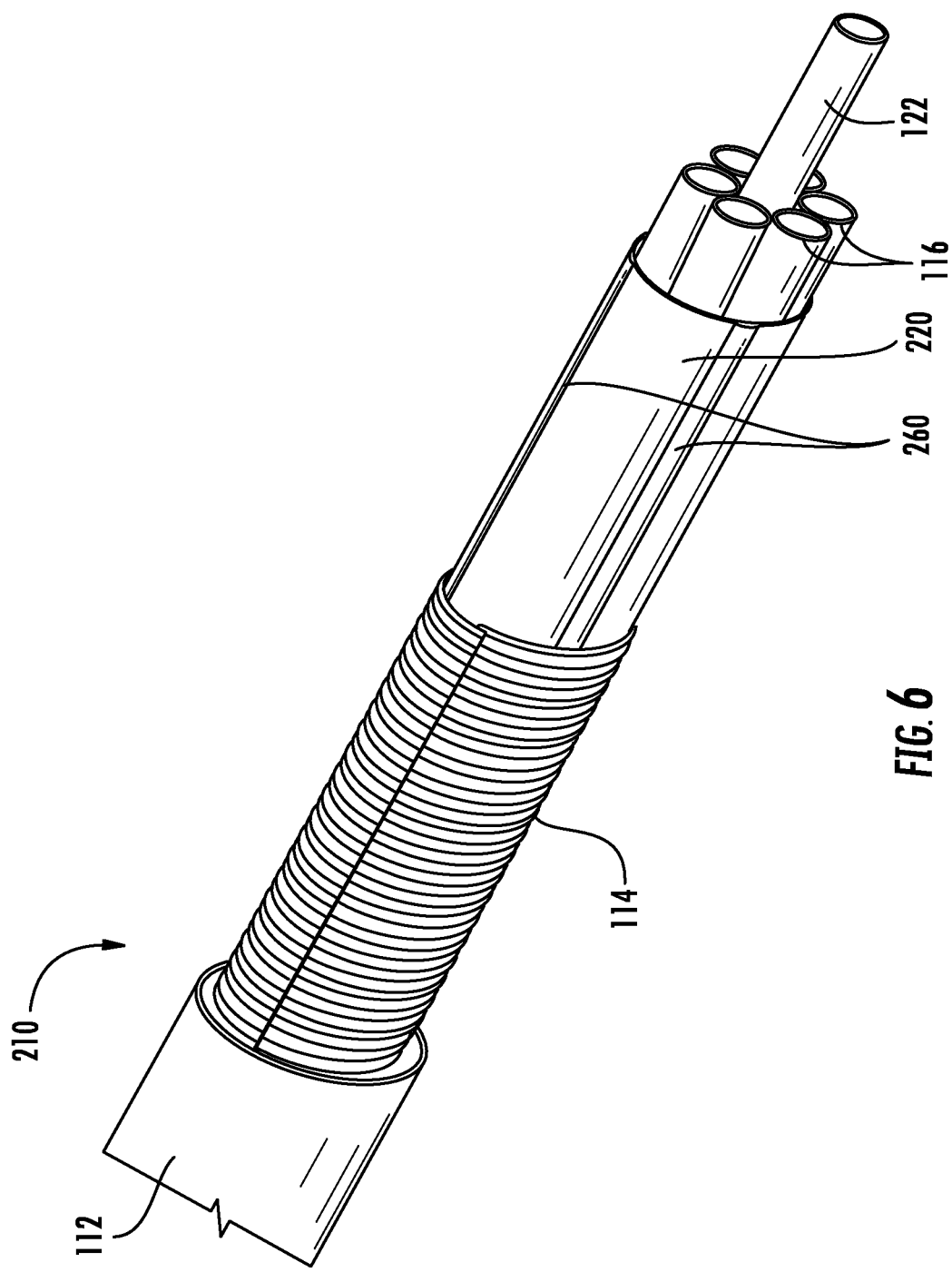
FIG. 6 is a perspective view of a fiber optic cable according to another exemplary embodiment.

Referring to FIG. 6, in still other contemplated embodiments, a binder sleeve 220 of a cable 210, otherwise similar to cable 110, may be extruded or otherwise formed with raised features 260 (e.g., a ridge) other than those raised portions 134 (FIG. 2) created by the contents of the core 126 that are interior to the binder sleeve 120. Such raised features 260 may extend axially along the binder sleeve 120 to increase or otherwise control the contact area between the binder sleeve 220 and the armor 114 of the cable 210 to encourage bonding therebetween. In some such embodiments, the raised portions 134 may also serve as integral ripcords or other features to help tear open the binder sleeve 220.

Technology disclosed herein may, for example, facilitate a single step procedure for accessing contents at the end 146 of an armored fiber optic cable 110, such as buffer tubes 116, which may then be immediately available for routing and fiber access. Further, there may be no binder yarn and/or water blocking components to remove when accessing the end of such a cable, which may otherwise require additional steps in the process. As such, this technology may significantly shorten the time and effort required to access buffer tubes. Technology disclosed herein, may allow for fewer tools to remove the jacket, armor, and binder; may reduce or eliminate chemicals that remove oils or other filling compounds within a core; may reduce the risk of damaging buffer tubes during the access process; and/or may reduce the risk of contaminating an end enclosure with binders or gels that could adversely impact fiber splices, for example.

According to an alternative solution, the binder sleeve 120 may not be bonded to the armor 114 or may not be bonded very much thereto such that the binder sleeve 120 stays with the core 126 of the cable 110 during the tubing-off process. For example, when the cable 110 is accessed from the end 146, via the tubing-off process, the armor 114 and jacket 112 slide over the binder sleeve 120, which may then be removed from the core 126 in a separate step to access contents of the end that are interior to the binder sleeve 120. As discussed above, bonding between the binder sleeve 120 and the underlying contents of the core 126 may be controlled (e.g., increased) by material composition selection for the binder sleeve 120 and core contents. Likewise bonding between the binder sleeve 120 and the armor 114 may be influenced (e.g., reduced) by material selection, such as by selecting those materials that naturally do not bond or do not bond well with one another for the binder sleeve 120 and armor 114 or coatings thereon. Alternatively, a barrier, such as a tape, oil, powder, etc., may be added between the binder sleeve 120 and the armor 114 to prevent bonding. Alone or in combination with one or more of the above techniques, the spacing between the armor and the core may be increased to reduce the contact area between the binder sleeve 120 and the armor 114. The armor 114 may be chilled prior art extruding the jacket 112, to absorb heat from extruded material. Lubricants may be added under the armor 114, such as adhered to the outside of the binder sleeve 120, to decrease friction between the binder sleeve 120 and the armor 114. Such lubricants may be solid lubricants, such as talc or other lubricants as described herein or known in the art. Aside from decoupling the binder sleeve 120 from the armor 114, the attributes and properties of such cables may be the same as for the other embodiments described herein, such as in terms of geometry, composition, performance, manufacturing, etc.

In still other design solutions, the tubing-off process may be facilitated by having no binder film or binder yarns between the armor and contents of the core that are typically interior to the binder, such as buffer tubes 116, micromodules, sub-unit cables, etc. Instead, the equipment to apply the armor 114 may be positioned immediately after the stranding equipment and the armor 114 may additionally serve as a binder for the core 126. As with the binder sleeve process, a caterpuller or other equipment may be used to control the stranded elements, such as at intermediate locations on the manufacturing line, such as between the stranding equipment and armor equipment, and/or between the armor equipment and the extruder for the jacket 112. Such a cable may appear similar to the cable 110, but without the binder sleeve 120. In such embodiments, water swellable powder may be adhered to the interior of the armor 114. In some such embodiments, the armor 114 may be applied as a helical wrap around the core, instead of a folded or rolled sheet. Such a solution may be cumbersome to implement because the buffer tubes 116 may unwind to an undesirable degree before being bound by the armor 114. However, such a solution may be more useful for embodiments with long lay lengths of an SZ strand and/or with unstranded core components.

The construction and arrangements of the armored fiber optic cables, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic cable, comprising:
    a core comprising:
        tubes, each tube having a passage defined therein;
        optical fibers positioned in the passages; and
        a binder sleeve defining an exterior of the core, the binder sleeve surrounding the tubes in a circumferential direction, the binder sleeve being a thin-layer of polymer material that is continuous in the circumferential direction around the tubes and continuous in the radial and lengthwise directions and that is extruded over the tubes;
        wherein the core has raised portions on the exterior thereof as well as recessed portions, and wherein the raised portions extend radially outward from a center of the core further than the recessed portions;
    armor surrounding the core, wherein the binder sleeve is bonded to the armor and forms a direct coupling at at least some of the raised portions and wherein the binder sleeve is not directly bonded to the armor at at least some of the recessed portions; and
    a jacket surrounding the armor;
    wherein the armor is corrugated, wherein the corrugations have peaks and valleys along a surface of the armor facing the core, wherein the peaks extend radially inward toward a center of the cable further than the valleys, and wherein at least some of the peaks of the corrugations are directly bonded to the binder sleeve of the core and at least some of the valleys of the armor are not directly bonded to the binder sleeve;
    wherein the armor comprises a metal and a coating thereon, wherein the coating is on a surface of the armor facing the core, and wherein the polymer of the binder sleeve contacts and is bonded to the coating of the armor at the at least some of the raised portions.

2. The cable of claim 1, wherein the polymer is polyethylene and the coating comprises a bonding agent.

3. The cable of claim 1, wherein spacing between the armor and the core is such that for an end section of the cable where the armor and the jacket of the end section are fully severed from the armor and the jacket of the rest of the cable 50 centimeters from an end of the cable corresponding to the end section, and where the tubes and the optical fibers of the core of the end section are not severed from corresponding tubes and optical fibers of the core of the rest of the cable, the binder sleeve remains bonded to the armor and the jacket of the end section when the armor and the jacket of the end section are pulled in a lengthwise direction of the cable away from the rest of the cable such that the jacket and the armor of the end section, as well as at least some of the binder sleeve bonded to the armor, slide together and relative to the tubes and the optical fibers of the core of the end section.

4. The cable of claim 3, wherein a tube-off force, to pull the jacket and the armor of the end section in the lengthwise direction of the cable away from the rest of the cable such that the jacket and the armor of the end section slide relative to the tubes and the optical fibers of the core of the end section, is not more than 150 newtons.

5. The cable of claim 4, wherein the tube-off force exceeds 20 newtons.

6. The cable of claim 3, wherein portions of the binder sleeve are spaced apart from the armor such that the spacing between the armor and the binder sleeve of the core is at least 0.5 mm on average.

7. The cable of claim 3, wherein portions of the binder sleeve are spaced apart from the armor such that the spacing between the armor and the binder sleeve of the core is no greater than 1.5 mm on average.

8. The cable of claim 1, wherein the core further comprises a central strength member, wherein the tubes are stranded around the central strength member, wherein the binder sleeve constrains the stranded tubes around the central strength member.

9. The cable of claim 8, wherein the tubes are stranded around the central strength member in an SZ stranding pattern.

10. The cable of claim 1, wherein an inner surface of the binder sleeve contacts outer surfaces of the tubes.

11. The cable of claim 1, wherein the bond between the armor and the binder sleeve is one of a melt bond formed between the polymer of the binder sleeve and the armor and a bond formed by a bonding agent.

12. A fiber optic cable, comprising:
    a core comprising:
        tubes, each tube having a passage defined therein;
        optical fibers positioned in the passages; and
        a binder sleeve defining an exterior of the core, the binder sleeve surrounding the tubes in a circumferential direction, the binder sleeve being a thin-layer of polymer continuous in the circumferential direction around the tubes and continuous in the radial and lengthwise directions and that is extruded over the tubes, wherein an inner surface of the binder sleeve contacts outer surfaces of the tubes;
    armor surrounding the core,
    wherein the armor is corrugated, wherein the corrugations have peaks and valleys along a surface of the armor facing the core, the peaks extending radially inward toward a center of the cable further than the valleys;
    wherein at least some of the peaks of the corrugations are bonded to the binder sleeve of the core to form a direct coupling of the armor and the binder sleeve at at least some of the peaks of the corrugations and at least some of the valleys are not directly bonded to the binder sleeve; and
    a jacket surrounding the armor.

13. The cable of claim 12, wherein the armor comprises a metal and a coating thereon, wherein the coating is on a surface of the armor facing the core, and wherein the polymer of the binder sleeve contacts and is bonded to the coating of the armor at the at least some of the peaks of the corrugations.

14. The cable of claim 13, wherein the polymer is polyethylene and the coating comprises a bonding agent.

\* \* \* \* \*